UNITED STATES PATENT OFFICE.

THOMAS A. EDISON, OF LLEWELLYN PARK, WEST ORANGE, NEW JERSEY.

PARA-PHENYLENE-DI-AMIN SUBSTANCE AND PROCESS RELATING THERETO.

1,283,706.      Specification of Letters Patent.      Patented Nov. 5, 1918.

No Drawing.      Application filed October 2, 1916. Serial No. 123,261.

*To all whom it may concern:*

Be it known that I, THOMAS A. EDISON, a citizen of the United States, and a resident of Llewellyn Park, West Orange, Essex county, New Jersey, have invented certain new and useful Para-phenylene-di-amin Substances and Processes Relating Thereto, of which the following is a description.

My invention relates to a substance capable of use in varnishes and of being hardened to form a composition suitable for molding various articles such, for example, as sound records, and it relates further to such composition of matter, and to an improved process of making the same. More specifically, my improved substance or enamel is of the kind described in United States patent to Aylsworth No. 1,098,608, comprising ingredients which react upon application of heat to form a hardened phenolic condensation product. The principal object of my invention is to provide an improved substance and process of such a character that the speed of the chemical reaction which causes the formation of the final hardened product is greatly increased. Other objects will appear more fully in the following specification and appended claims.

The patent to Aylsworth referred to describes a varnish composition comprising a permanently fusible resin of phenolic origin, which has mixed therewith a substance, such as hexa-methylene-tetra-amin, which is capable of reacting with the resin upon application of sufficient heat to form the final hardened phenolic condensation product. I have found that by the addition of a small amount of para-phenylene-di-amin to a composition of this character or to any other substances which react upon application of heat to form a hardened phenolic condensation product, the reaction is made several times as fast. Apparently, the para-phenylene-di-amin does not enter into the reaction except as a catalyzer. With the varnish composition of the said patent to Aylsworth, a weight of para-phenylene-di-amin equal to about one-half of one per cent. of the weight of the phenol resin may be employed. Upon application of heat to the varnish referred to, the same is converted into a final phenolic condensation product which is entirely free from defects or flaws and is accordingly very suitable for the molding of sound records and other objects molded with a high degree of accuracy.

Having now described my invention, what I claim as new and desire to protect by Letters Patent of the United States is as follows:—

1. A mixture comprising para-phenylene-di-amin and usual ingredients which react upon application of heat to form a hardened phenolic condensation product, substantially as described.

2. A mixture comprising approximately one-half part para-phenylene-di-amin to approximately one hundred parts of phenol resin and a sufficient amount of a usual agent capable of reacting with said resin to form a hardened phenolic condensation product, substantially as described.

3. The process which comprises incorporating para-phenylene-di-amin with usual substances which react upon application of heat to form a hardened phenolic condensation product, and heating the same to cause the hardening reaction to ensue, substantially as described.

4. The process which comprises incorporating para-phenylene-di-amin with a permanently fusible phenol resin and a usual substance which reacts therewith upon application of heat to form a hardened phenolic condensation product, and heating the same to cause the hardening reaction to ensue, approximately one-half part para-phenylene-di-amin being employed to each one hundred parts of phenol resin, substantially as described.

5. A composition of matter formed by heating in the presence of para-phenylene-di-amin usual substances which react upon heating to form a hardened phenolic condensation product, substantially as described.

6. The composition of matter formed by heating in the presence of approximately one-half part of para-phenylene-di-amin approximately one hundred parts of phenol resin and a sufficient amount of a usual agent which reacts with the phenol resin upon application of heat to form a hardened phenolic condensation product, substantially as described.

7. A composition of matter comprising hardened phenolic condensation product and para-phenylene-di-amin, substantially as described.

This specification signed and witnessed this 21st day of Sept., 1916.

THOS. A. EDISON.

Witnesses:
FREDERICK BACHMANN,
J. UNGER.